(12) United States Patent
Zhang et al.

(10) Patent No.: US 9,802,821 B2
(45) Date of Patent: Oct. 31, 2017

(54) METHOD FOR PREPARING TRANSITION METAL PHOSPHIDE

(71) Applicant: AGENCY FOR SCIENCE, TECHNOLOGY AND RESEARCH, Singapore (SG)

(72) Inventors: Shuang-Yuan Zhang, Singapore (SG); Si Yin Tee, Singapore (SG); Ming-Yong Han, Singapore (SG); Kwok Wei Shah, Singapore (SG); Chin Sheng Chua, Singapore (SG); Dongzhi Chi, Singapore (SG); Andy Hor, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/209,618

(22) Filed: Jul. 13, 2016

(65) Prior Publication Data

US 2017/0015558 A1 Jan. 19, 2017

(30) Foreign Application Priority Data

Jul. 13, 2015 (SG) .............................. 10201505483T

(51) Int. Cl.
*B01J 27/14* (2006.01)
*B01J 27/185* (2006.01)
*C01B 25/08* (2006.01)
*C25B 1/04* (2006.01)
*C25B 11/04* (2006.01)

(52) U.S. Cl.
CPC .............. *C01B 25/08* (2013.01); *C25B 1/04* (2013.01); *C25B 11/04* (2013.01); *Y02E 60/366* (2013.01)

(58) Field of Classification Search
CPC ...... B01J 27/14; B01J 27/185; B01J 27/1853; B01J 27/1856; B01J 27/186; C25B 1/04; C25B 11/04; C01B 25/08
USPC ........................................ 502/101, 208, 213
See application file for complete search history.

(56) References Cited

U.S. PATENT DOCUMENTS

| | | | | |
|---|---|---|---|---|
| 3,397,039 A * | 8/1968 | Peterson | ................. | C01B 25/06 423/299 |
| 4,145,314 A * | 3/1979 | Fung | ....................... | B01J 37/28 429/523 |
| 4,463,104 A * | 7/1984 | Antos | .................. | B01J 23/8966 208/138 |
| 7,446,075 B1 * | 11/2008 | Kolev | .................. | B01J 27/1853 208/208 R |

(Continued)

OTHER PUBLICATIONS

"Phase-Selective Synthesis of Nickel Phosphide in High-Boiling Solvent for All-Solid-State Lithium Secondary Batteries," Keigo Aso et al. Inorganic Chemistry (2011), 50, pp. 10820-10824.*

*Primary Examiner* — Patricia L Hailey
(74) *Attorney, Agent, or Firm* — Blakely, Sokoloff, Taylor & Zafman LLP

(57) ABSTRACT

There is provided a method of preparing transition metal phosphide comprising the step of mixing a solution of a transition metal precursor and a phosphorous precursor under conditions to form the transition metal phosphide. There is also provided a transition metal phosphide particle made according to the method as defined herein. There is additionally provided a method of preparing a transition metal phosphide-based electrode used for producing hydrogen in the electrolysis of water.

18 Claims, 3 Drawing Sheets

(56) References Cited

U.S. PATENT DOCUMENTS

| | | | |
|---|---|---|---|
| 8,940,656 B2* | 1/2015 | Yu | B01J 37/06 |
| | | | 204/157.52 |
| 2005/0214190 A1* | 9/2005 | Hyeon | B82Y 30/00 |
| | | | 423/299 |
| 2008/0258159 A1* | 10/2008 | Jun | B82Y 30/00 |
| | | | 257/94 |
| 2016/0199821 A1* | 7/2016 | Yoo | B01J 27/1853 |
| | | | 502/180 |
| 2016/0355936 A1* | 12/2016 | Dismukes | C25B 9/10 |

* cited by examiner

[Fig. 1]
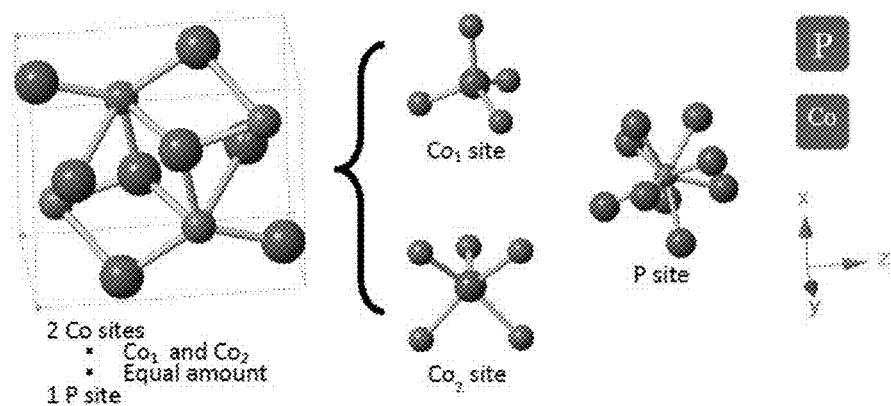
[Fig. 2]
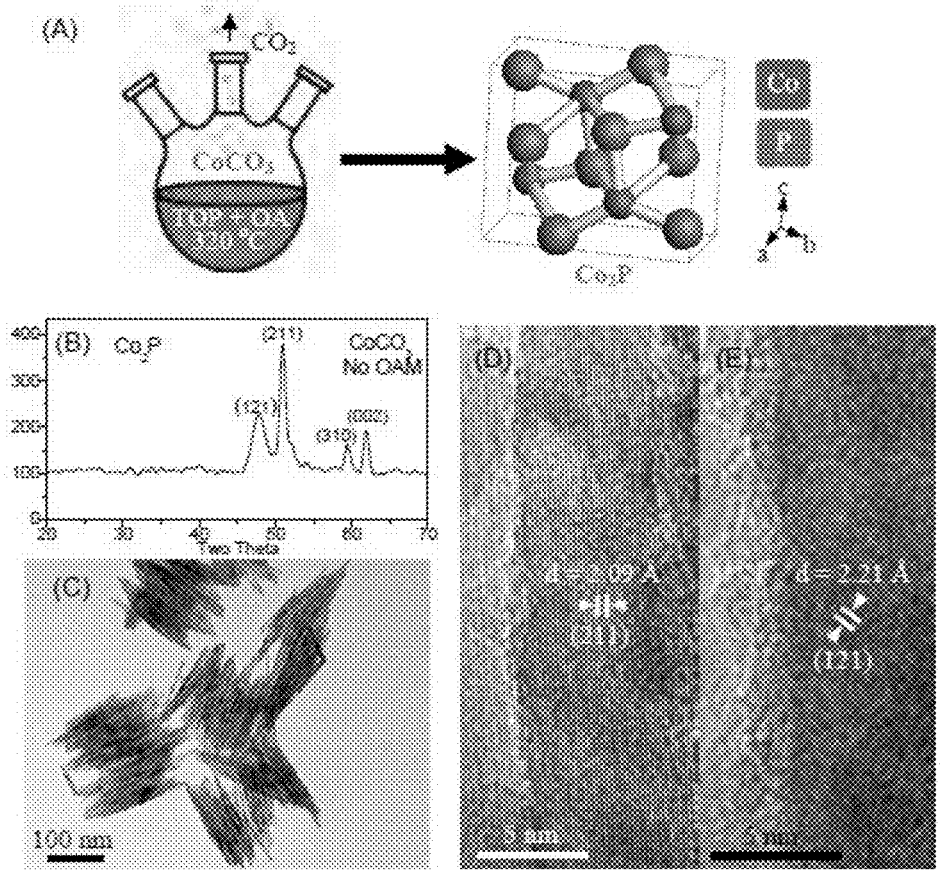

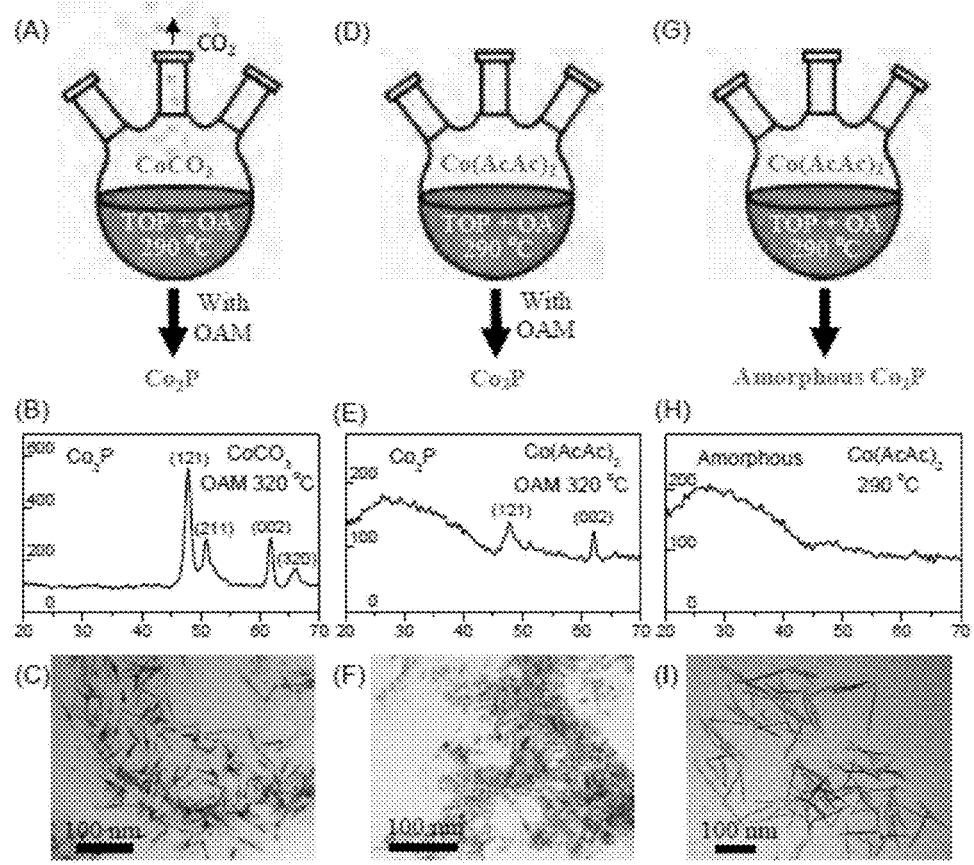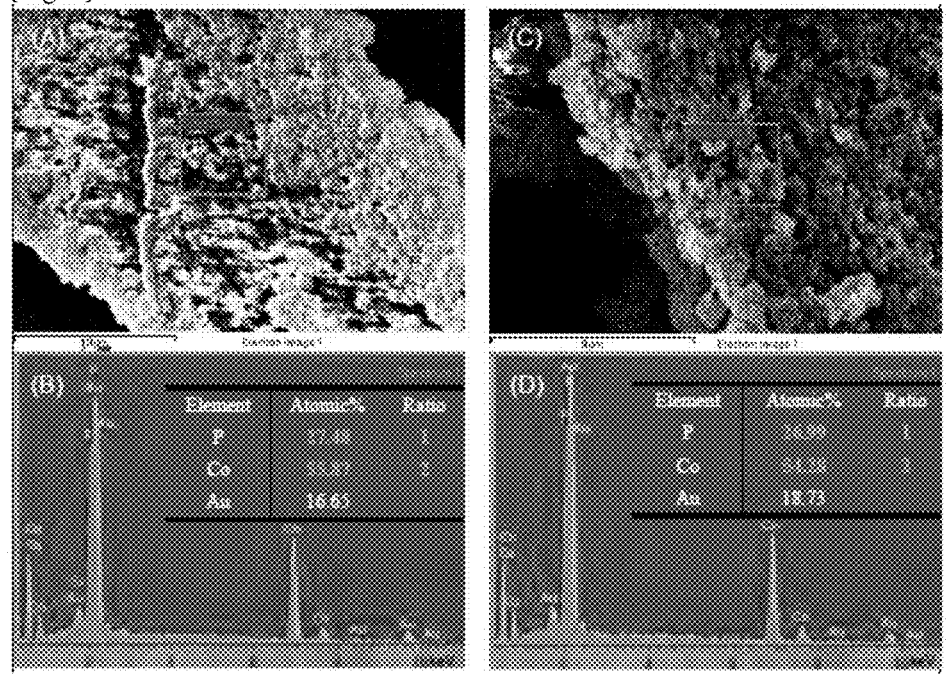

[Fig. 5]
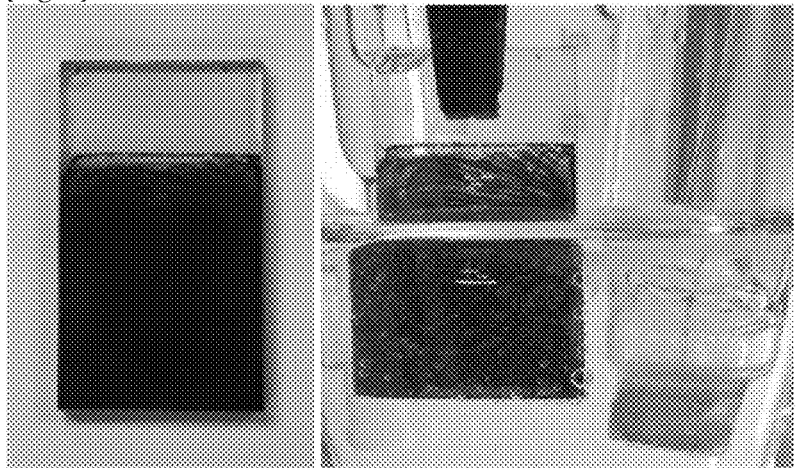
[Fig. 6]
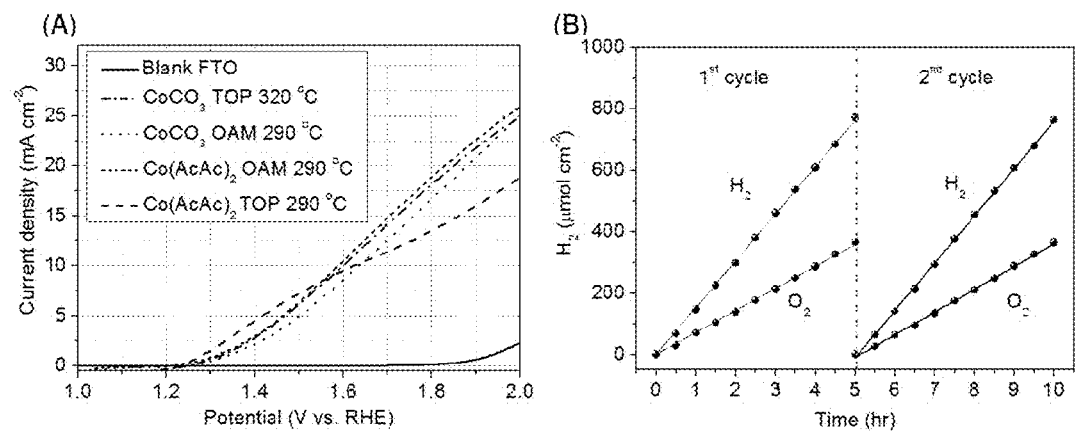
[Fig. 7]
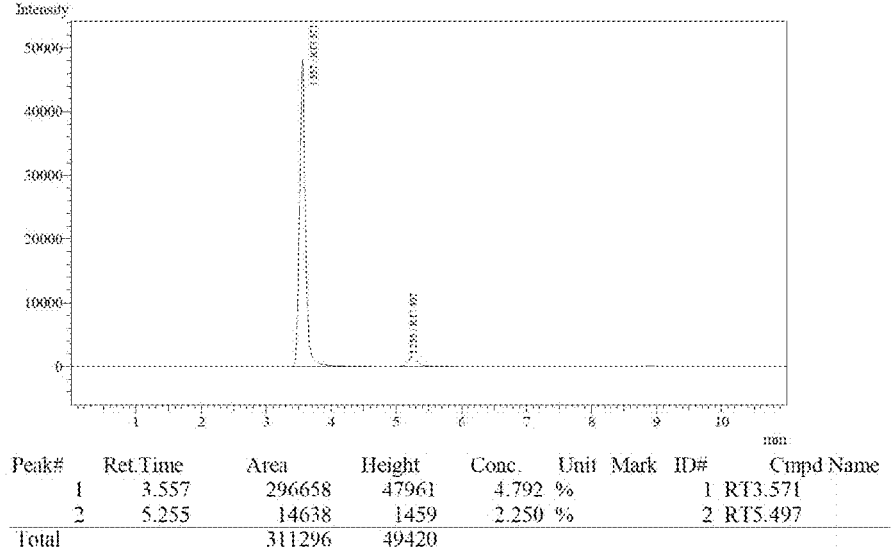

METHOD FOR PREPARING TRANSITION METAL PHOSPHIDE

TECHNICAL FIELD

The present invention generally relates to a method for preparing a transition metal phosphide. The present invention also relates to a transition metal phosphide particle as prepared herein, a method of preparing a transition metal phosphide-based electrode used for producing hydrogen in the electrolysis of water.

BACKGROUND ART

Hydrogen production from water splitting is a promising source of clean energy that has the potential to mitigate the crises of fossil fuel dependence and global warming. Today, the industry technology for the hydrogen production is predominantly the steam reforming from hydrocarbons, such as methane, at high temperature up to 1000° C., followed by a water-gas shift reaction. However, this industry process generates one carbon dioxide molecule for every four hydrogen molecules produced. Therefore, it is necessary to develop an alternative green and sustainable energy technology.

Electrolytic water splitting represents a prospective approach to produce hydrogen as carbon-neutral fuel. Compared to steam reforming, this approach has many advantages, such as low temperature, high purity hydrogen, simple and scalable process, and more importantly there is no carbon dioxide emission and electrolytic water splitting uses sustainable source which is water. In general, electrolytic water splitting at acidic condition involves water oxidation on the anode to produce oxygen (or Oxygen Evolution Reaction and denoted as OER) as shown in the half-cell reaction (i) below:

$$2H_2O(l) \rightarrow O_2(g) + 4H^+(aq) + 4e^- \quad E° = -1.229 \text{ V (vs. SHE)} \quad \text{(i)}$$

and proton reduction on the cathode to produce hydrogen (or Hydrogen Evolution Reaction and denoted as HER) according to the equation (ii) below:

$$4H^+(aq) + 4e^- \rightarrow 2H_2(g) \quad E° = 0.000 \text{V(SHE)} \quad \text{(ii)}$$

Reaction (i) is the rate limiting step in overall water splitting process because it has higher energy barrier. On the other hand, the proton reduction as shown in reaction (ii) is more favourable as it has much lower energy barrier. When the electrolysis of water is carried out under basic condition, the following half-cell reactions (iii) to (iv) will occur:

$$\text{Anode (OER): } 4OH^-(aq) \rightarrow O_2(g) + 2H_2O(l) + 4e^- \quad E° = -0.401 \text{ V (vs. SHE)} \quad \text{(iii)}$$

$$\text{Cathode (HER): } 4H_2O(l) + 4e^- \rightarrow 2H_2(g) + 4OH^-(aq) \quad E° = -0.828 \text{ V (vs. SHE)} \quad \text{(iv)}$$

Without an efficient catalyst, a significant overpotential is required for water oxidation or reduction, resulting in a low efficiency process. Therefore, the fabrication of an electrode bearing a highly efficient catalyst for water oxidation is the key technology in the development of an economic water splitting process.

Extensive efforts have been made to develop an efficient electrocatalysts for water oxidation application. Recent developments include cobalt and manganese oxide clusters, ruthenium oxide, iridium oxide and nickel oxide based electrocatalysts. Among the oxides of the transition metals, cobalt oxides electrocatalysts have received increasing attention recently due to their earth-abundant nature. However, the electrocatalytic efficiency of these reported catalysts has not reached the level of economic viability. Exploring highly efficient and cost-effective electrocatalysts are still drawing massive investigations around the globe.

As an electrocatalyst for water oxidation, cobalt as a transition metal has a wide range of stable stoichiometries when present as cobalt phosphide (such as $Co_3P$, $Co_2P$, $CoP$, $Co_3P_2$) and thus a high selection portfolio of different chemical phases after reactions. While there are many methods currently available to produce cobalt phosphides, these methods suffer from generation of competing phases and/or lack of size and shape control. In most cases, a mixture of a few stoichiometries is present with a major product and a few by-products. Hence, an additional separation step is necessary to produce the desired cobalt phosphide of high purity with desired crystallinity. Due to many possible variation of stoichiometry, synthesizing cobalt phosphide with a desired composition and high purity is still a huge challenge.

The preparation routes for cobalt phosphides have evolved in the last decade due to the advances in both the synthetic methodologies and the characterization techniques. The most conventional method of preparing cobalt phosphides involves the direct reaction of cobalt metal and highly toxic phosphines or phosphorous pentachloride or triphenylphosphine ($PPh_3$). Subsequently, the previous method has been replaced by reacting cobalt ion with phosphorous, tris(trimethylsilyl)phosphine ($P(SiMe_3)_3$). A method using a less reactive and inexpensive phosphorous with controlled shape, size and phase (purity) in the preparation of cobalt phosphides is thus highly desirable.

Therefore, there is a need to provide a method of preparing transition metal phosphide with controlled shape, size and phase that overcomes, or at least ameliorates, one or more of the disadvantages described above.

As the activity of the electrocatalyst is a surface phenomenon, it is critically important to design the proper shape, phase and size of the material. Hence, there is also a need to provide a method of preparing transition metal phosphide-based electrode used for electrocatalytic splitting of water for producing hydrogen that overcomes, or at least ameliorates, one or more of the disadvantages described above.

SUMMARY OF INVENTION

According to a first aspect, there is provided a method of preparing transition metal phosphide comprising the step of mixing a solution of a transition metal precursor and a phosphorous precursor under conditions to form said transition metal phosphide.

Advantageously, the method of preparing transition metal phosphide can be a "one-pot" method. Hence, the method is a one-step reaction involving only one reaction vessel. The method does not require more than one step to form the transition metal phosphide and the reaction need not be stopped for mixing with another reaction vessel. Still advantageously, the method of preparing transition metal phosphide can be used to produce transition metal phosphide with a desired shape, size and/or phase.

According to a second aspect, there is provided a transition metal phosphide particle made according to the method as defined herein.

Advantageously, the transition metal phosphide prepared using the method described herein may not have other stoichiometric by-products.

According to a third aspect, there is provided a method of preparing a transition metal phosphide-based electrode used for producing hydrogen in the electrolysis of water, comprising the steps of (a) mixing a solution of a transition metal precursor and a phosphorous precursor under conditions to form a transition metal phosphide solution; (b) casting said transition metal phosphide solution onto a substrate; and (c) annealing of the substrate coated with the transition metal phosphide solution.

Advantageously, the method of producing hydrogen can be carried out at atmospheric pressure and/or at room temperature; hence the electrocatalytic process can be scaled-up easily.

Advantageously, when coupled to a solar cell, the method of producing hydrogen may display a high and/or stable electrocatalytic activity. In addition, this method may be capable of achieving high efficiency water splitting for hydrogen production.

DEFINITIONS

The following words and terms used herein shall have the meaning indicated:

The terms "nano" or "nano-scale" when used in conjunction with an object, may be interpreted broadly to refer to the dimension of that object to be less than one micrometer, or less than 1000 nm, less than 500 nm, less than 100 nm or less than 50 nm.

As used herein, the term "nanostructure" refers to elongated chemical structures having a diameter on the order of nanometers and a length on the order of microns to millimeters, resulting in an aspect ratio greater than 10, 100, 1000, 10,000, or greater. In some cases, the nanostructure may have a diameter less than 1 μm, less than 100 nm, 50 nm, less than 25 nm, less than 10 nm, or, in some cases, less than 1 nm. Typically, the nanostructure may have a cylindrical or pseudo-cylindrical shape. In some cases, the nanostructures comprise elongated nanowires and short nanorods.

The term "phase-pure" refers to a substance that is one thermodynamic phase or substantially one thermodynamic phase. Where the substance is substantially one thermodynamic phase, the substance may include other components that are not in the same thermodynamic phase as the substance, but are present in so minute amounts that the components are not significantly different from the 'noise' present when analysed, such as on x-ray diffraction patterns. Comparison of the x-ray diffraction pattern of a given standard and the produced substance is one of a number of methods that may be used to determine whether the substance is phase-pure. For example, a substance having substantially no other phase but dicobalt phosphide $Co_2P$, as determined by a lack of reflections corresponding to non-dicobalt phosphide phases by conventional x-ray diffraction (denoted as XRD thereafter), is phase-pure. Exemplary standards include those XRD spectra provided by the National Institute of Standards and Technology (NIST) (Gaithersburg of Maryland of United States of America) and/or the International Centre for Diffraction Data (ICDD, formerly the Joint Committee on Powder Diffraction Standards [JCPDS]) (Newtown Square of Pennsylvania of United States of America).

The term "electrode" as employed herein is used in its conventional sense to refer to a component of an electrochemical cell that is in contact with an electrolyte through which current can flow by electronic movement. Electrodes, which are essential components of both galvanic (current producing) and electrolytic (current using) cells, can be composed of a number of electrically conductive materials, for example, silver, lead, zinc, aluminium, copper, iron, nickel, mercury, graphite, gold, or platinum, and oxides, dioxides and alloys thereof.

The term "reference electrode" is used to refer to an electrode which provides a stable, constant potential regardless of the type, or concentration, of species present in the fluid in which the reference electrode is placed. Thus, one can detect meaningful changes in the potential of a working electrode which is paired with a reference electrode. These meaningful changes can be detected by comparing the changes in the paired working electrode to the constant potential of the reference electrode. The non-limiting examples of reference electrode are standard hydrogen electrode (denoted as SHE hereafter), standard calomel electrode (denoted as SCE hereafter), Ag/AgCl electrode and reversible hydrogen electrode (denoted as RHE hereafter).

The term "working electrode" is used to refer to the electrode that is monitored to determine the amount of electrical signal generated at the electrode subassembly, which is then correlated with the amount of a chemical compound present in the electrolyte. The working electrode comprises a catalytic surface which catalysis the conversion of chemical signal to electrical signal which surface is comprised of a material selected from the group consisting of platinum, cobalt, palladium, nickel, carbon, noble metals (e.g., gold), and oxides, dioxides and alloys thereof. The term "electric signal" used herein means at least one signal of an electric current, electric potential, impedance and capacitance.

The term "counter electrode" is used to refer to an electrode in an electrochemical circuit which acts as a current source or sink to complete the electrochemical circuit. Although it is not essential that a counter electrode be employed where a reference electrode is included in the circuit and capable of performing the function of a counter electrode, it is preferred to have separate counter and reference electrodes because the reference potential provided by the reference electrode is most stable when it is at equilibrium. If the reference electrode is required to act further as a counter electrode, the current flowing through the reference electrode may disturb this equilibrium. Consequently, separate electrodes functioning as counter and reference electrodes are most preferred.

As used here, the term "electrolyte" is used in its conventional sense as any substance that provides ionic conductivity, and through which electrochemically active species can diffuse. Electrolytes can be solid, liquid, or semi-solid (e.g., in the form of a gel). Common electrolytes include sulfuric acid and sodium chloride, which ionize in solution. Electrochemically active species that are present in the electrolyte can undergo electrochemical reactions (oxidation or reduction) at the surface of the electrode. The rate at which the electrochemical reactions take place is related to the reactivity of the species, the electrode material, the electrical potential applied to the electrode, and the efficiency at which the electrochemically active species is transported to the electrode surface.

The term "overpotential" is an electrochemical term which refers to the potential difference between a half-reaction's thermodynamically determined reduction potential and the potential at which the reaction is experimentally observed, and thus describes an electrolytic cell voltage efficiency. The overpotential overcomes various kinetic activation barriers of the electrolytic cell and varies between cells and operational conditions.

An electrocatalyst is a catalyst that participates in an electrochemical reaction and serves to reduce activation barriers of a half-reaction, and thus, reduces the overpotential of said reaction.

The term "phosphine" when used without the "substituted" modifier refers to a compound of the formula $PR_3$, wherein each R is independently hydrogen, alkyl, alkenyl, aryl, and aralkyl, as those terms are defined below. Non-limiting examples of phosphines include $PMe_3$, $PPh_3$, $PPh_2Me$, $PPhMe_2$, and $PPh_2Et$. The term "alkylphosphine" is a subset of phosphine, wherein each R is an alkyl group. Alkylphosphine may be monoalkyl or dialkyl or trialkyl phosphine. Similarly, the term "arylphosphine" is a subset of phosphine, wherein each R is an aryl group. Arylphosphine may be monoaryl or diaryl or triaryl phosphine. In addition, the term "arylalkyl phosphine" is a subset of phosphine, wherein the three possible substituents on phosphorous atom comprise either at least one aryl group or one alkyl group.

The term "phosphine oxide" as a group or part of a group refers to a compound of the formula $OPR_3$. The variants of R is similar to the one described for phosphine.

The term "alkyl" as a group or part of a group refers to a straight or branched aliphatic hydrocarbon group having 1 to 12 carbon atoms, 1 to 10 carbon atoms, 1 to 6 carbon atoms, or 1, 2, 3, 4, 5, 6, 7, 8, 9, 10, 11 or 12 carbon atoms. Examples of suitable straight and branched C1-C6 alkyl substituents include methyl, ethyl, n-propyl, 2-propyl, n-butyl, sec-butyl, t-butyl, hexyl, and the like. The group may be a terminal group or a bridging group.

The term "alkenyl" as a group or part of a group denotes an aliphatic hydrocarbon group containing at least one carbon-carbon double bond and which may be straight or branched having 2 to 12 carbon atoms, 2 to 10 carbon atoms, 2 to 6 carbon atoms, or 2, 3, 4, 5, 6, 7, 8, 9, 10, 11 or 12 carbon atoms in the chain. The group may contain a plurality of double bonds and the orientation about each double bond is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

The term "aryl" as a group or part of a group denotes (i) an optionally substituted monocyclic, or fused polycyclic, aromatic carbocycle (ring structure having ring atoms that are all carbon) preferably having from 5 to 12, or 5, 6, 7, 8, 9, 10, 11, or 12 carbon atoms per ring. Examples of aryl groups include phenyl, naphthyl, and the like; (ii) an optionally substituted partially saturated bicyclic aromatic carbocyclic moiety in which a phenyl and a $C_{5-7}$-cycloakyl or $C_{5-7}$-cycloalkenyl groups are fused together to form a cyclic structure, such as tetrahydronaphthyl, indenyl or indanyl. The group may be a terminal group or a bridging group. Typically an aryl group is a $C_{6-C18}$ aryl group.

The term "aralkyl" when used without the "substituted" modifier refers to the monovalent group -alkanediyl-aryl- or -alkanediyl-CH-(aryl)$_2$, in which the terms alkanediyl and aryl are each used in a manner consistent with the definitions provided above. Non-limiting examples of aralkyls are: phenylmethyl (benzyl, Bn) and 2-phenyl-ethyl. When the term aralkyl is used with the "substituted" modifier one or more hydrogen atom from the alkanediyl and/or the aryl group has been independently replaced by —OH, —F, —Cl, —Br, —I, —$NH_2$, —$NO_2$, —$CO_2H$, —$CO_2CH_3$, —CN, —SH, —$OCH_3$, —$OCH_2CH_3$, —$C(O)CH_3$, —$NHCH_3$, —$NHCH_2CH_3$, —$N(CH_3)_2$, —$C(O)NH_2$, —$OC(O)CH_3$, or —$S(O)_2NH_2$. Non-limiting examples of substituted aralkyls are: (3-chlorophenyl)-methyl, and 2-chloro-2-phenyl-eth-1-yl.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DESCRIPTION

Exemplary, non-limiting embodiments of a method for preparing transition metal phosphide will now be disclosed.

The method may comprise the step of mixing a solution of a transition metal precursor and a phosphorous precursor under conditions to form said transition metal phosphide.

The transition metal precursor used in the method may contain, but not limited to transition metal such as cobalt (Co), iron (Fe), nickel (Ni), manganese (Mn) or combinations thereof.

When cobalt phosphide is desired, the method comprises the step of mixing a solution of a cobalt precursor and a phosphorous precursor under conditions to form cobalt phosphide.

The cobalt precursor used in the method may be selected from the group consisting of ammonium cobalt sulphate, cobalt benzoylacetonate, cobalt bromide, cobalt carbonate, cobalt chloride, cobalt fluoride, cobalt iodide, cobalt nitrate, cobalt oxalate, cobalt phosphate, cobalt sulphate, cobalt acetylacetonate, cobalt acetate, cobalt thiocyanate and mixtures thereof. The cobalt precursor may be a cobalt (II) salt such that the cobalt (II) salt may be selected from the group consisting of ammonium cobalt (II) sulphate, cobalt (II) benzoylacetonate, cobalt (II) bromide, cobalt (II) carbonate, cobalt (II) chloride, cobalt (II) fluoride, cobalt (II) iodide, cobalt (II) nitrate, cobalt (II) oxalate, cobalt (II) phosphate, cobalt (II) sulphate, cobalt (II) acetylacetonate, cobalt (II) acetate, cobalt (II) thiocyanate and mixtures thereof.

The phosphorous precursor used in the method may include but not limited to trioctyl phosphine (denoted as TOP thereafter), tributyl phosphine, trinonyl phosphine oxide, trioctyl phosphine oxide (denoted as TOPO thereafter), trihexyl phosphine oxide, butyl diphenyl oxide, or tert-butyl diphenyl oxide.

The method may further comprise the step of adding an additive to the solution mixture. The additive may be used to promote the ionization and solubilization of the transition metal phosphide. The additive may not be particularly limited and may be any additive that can function as above. An exemplary additive is an amine, such as oleylamine (OAM).

The method may further comprise the step of pre-heating the solution mixture. The pre-heating temperature of the solution mixture may be in the range of about 90° C. to about 130° C., about 105° C. to about 115° C., about 90° C., about 95° C., about 100° C., about 105° C., about 110° C., about 115° C., about 120° C., about 125° C., or about 130° C.

The method may further comprise the step of degassing the solution mixture. The solution mixture may be degassed for a duration of about 10 minutes to about 30 minutes, about 10 to 15 minutes, about 10 minutes to about 20 minutes, about 10 minutes to about 25 minutes, about 15 minutes to about 20 minutes, about 15 minutes to about 25 minutes, about 15 minutes to about 30 minutes, about 20 minutes to about 25 minutes, about 20 minutes to about 30 minutes, or about 25 minutes to 30 minutes.

The degassing step may be undertaken in a vacuum and in an inert gas atmosphere. The inert gas atmosphere may be created using an inert gas selected from argon, helium, nitrogen or hydrogen. The inert gas atmosphere may be created by introducing a continuous inert gas flow to the solution mixture. The inert gas atmosphere may also aid to reduce the risk of explosion due to the use of the phosphorus precursor. The degassing procedure is crucial as it provides free oxygen and water environment for the formation of the cobalt phosphide. In addition, carbon dioxide that is produced from the reaction can be quickly eliminated during degassing as the presence of carbon dioxide may decrease the yield and selectivity of the transition metal phosphide formation reaction.

The method may further comprise the step of heating the solution mixture at a predetermined temperature. The thermal decomposition of the transition metal phosphide takes place when the solution mixture is heated up to the predetermined temperature, which is in the range of about 270° C. to about 350° C., about 270° C. to about 290° C., about 270° C. to about 310° C., about 270° C. to about 320° C., about 270° C. to about 330° C., about 290° C. to about 310° C., about 290° C. to about 320° C., about 290° C. to about 330° C., about 290° C. to about 350° C., about 310° C. to about 320° C., about 310° C. to about 330° C., about 310° C. to about 350° C., about 320° C. to about 330° C., about 320° C. to about 350° C., or about 320° C. to about 350° C. The heating step may be under protection of an inert gas, where the inert gas is as mentioned above.

The predetermined temperature of the solution mixture may be maintained at a range of about 90 minutes to about 150 minutes, about 90 minutes to about 100 minutes, about 90 minutes to about 110 minutes, about 90 minutes to about 120 minutes, about 90 minutes to about 130 minutes, about 100 minutes to about 110 minutes, about 100 minutes to about 120 minutes, about 100 minutes to about 130 minutes, about 100 minutes to about 150 minutes, about 110 minutes to about 120 minutes, about 110 minutes to about 130 minutes, about 110 minutes to about 150 minutes, about 120 minutes to about 130 minutes, about 120 minutes to about 150 minutes, or about 130 minutes to about 150 minutes.

The method may comprise the step of cooling the solution mixture. Once cooled, the method may comprise the step of adding an organic solvent to the solution mixture to precipitate out the transition metal phosphide. The organic solvent is not particularly limited and depends on the type of transition metal precursor and phosphorous precursor used. For example, toluene or hexane may be used to precipitate dicobalt phosphide.

Exemplary, non-limiting embodiments of a transition metal phosphide will now be disclosed. The transition metal phosphide particle may be made according to the method as defined herein.

The transition metal phosphide may have a diameter in the range of about 2 nm to about 20 nm, about 2 nm to about 4.5 nm, from about 2.5 nm to about 6.5 nm, from about 2.5 nm to about 10 nm, from about 4.5 nm to about 6.5 nm, from about 4.5 nm to about 10 nm, from about 4.5 nm to about 20 nm, from about 6.5 nm to about 10 nm, from about 6.5 nm to about 20 nm, or from about 10 nm to about 20 nm The transition metal phosphide may have a length in the range of about 200 nm to about 350 nm, about 200 nm to about 250 nm, about 200 nm to about 280 nm, about 200 nm to about 300 nm, about 250 nm to about 280 nm, about 250 nm to about 300 nm, about 250 nm to about 350 nm, about 280 nm to about 300 nm, about 280 nm to about 350 nm, or about 300 nm to about 350 nm.

The transition metal phosphide particle may be in the form of a wire, a rod, a sphere or a sheet.

The transition metal phosphide in the particle may be amorphous, semi-crystalline, crystalline or mixtures thereof.

The metal transition phosphide produced in this method has a wide range of stable stoichiometries. For example, when cobalt phosphide is prepared, the cobalt phosphide produced may be in the form of one of the following forms, but not limited to $Co_2P$, $CoP$, $Co_2P_3$, $Co_2P_5$ and $CoP_3$ of high purity with controlled crystallinity. The transition metal phosphide prepared using the method described herein is substantially pure or may be with the absence of by-products. By selecting appropriate reaction temperature and additives, transition metal phosphide of desired characteristics (shape, size and phase) can be obtained. If no additive is used, the aspect ratio of the transition metal phosphide produced may be of elongated wires. On the other hand, when the additive is added to the solution mixture, the aspect ratio of transition metal phosphide tends to become short rods. Therefore, the method of preparing transition metal phosphide in the present disclosure may be able to control the shape and size of the produced phosphide simultaneously.

When the stoichiometric ratio of cobalt and phosphorous is of 2 to 1, the formula of the cobalt phosphide is then $Co_2P$. The crystal structure of the synthesized dicobalt phosphide belongs to the orthorhombic crystal system with space group Pnma (62). The chemical structure and unit cell parameters of the dicobalt phosphide are summarized in Table 1.

TABLE 1

Chemical structure and cell parameters

| | |
|---|---|
| Formula | Co2 P1 |
| Crystal system | orthorombic |
| Space-group | Pnma (62) |

TABLE 1-continued

Chemical structure and cell parameters

| | |
|---|---|
| Cell parameters | a = 5.6460 Angstrom; b = 3.5130 Angstrom; c = 6.6080 Angstrom |
| Cell ratio | a/b = 1.6072; b/c = 0.5316; c/a = 1.1704 |
| Cell volume | 131.07 Å$^3$ |

With reference to FIG. 1 that shows the unit cell of dicobalt phosphide, there are two cobalt sites, which are denoted as $Co_1$ and $Co_2$ sites. The amount of $Co_1$ sites present in dicobalt phosphide is equal to the amount of $Co_2$ sites. Each cobalt atom at $Co_1$ site would bind to four phosphorous atoms; while each cobalt atom at $Co_2$ site would be bonded with five phosphorous atoms. Each phosphorous atom in dicobalt phosphide is bonded to nine cobalt atoms in average. Therefore, the stoichiometric ratio of cobalt to phosphorous in dicobalt phosphide would be of 2 to 1 and it will give rise to $Co_2P$ formula.

Exemplary, non-limiting embodiments of a method for making a transition metal phosphide-based electrode will now be disclosed.

The method may comprise the steps of (a) mixing a solution of a transition metal precursor and a phosphorous precursor under conditions to form a transition metal phosphide solution; (b) applying said transition metal phosphide solution onto a substrate; and (c) annealing of the substrate coated with the transition metal phosphide solution. Non-limiting examples of the transition metal phosphide may include iron phosphide, nickel phosphide, dinickel phosphide, cobalt phosphide, dicobalt phosphide and mixtures thereof. The transition metal used may be dicobalt phosphide.

In the method, transition metal phosphide particles may be obtained from the transition metal phosphide solution in step (a) and dispersed in an organic solvent to form a (second) transition metal phosphide solution in step (b). The organic solvent may be used as a pure solvent or a mixture of at least two solvents, where the respective evaporation times of the solvents are optimized. By using a mixture of at least two solvents, the morphology of the annealed transition metal phosphide on the substrate may be improved. Alternatively, the transition metal phosphide solution in steps (a) and (b) may be the same.

The applying step may include but not limited to drop casting, spin coating, dip coating, spray coating, or blade coating (such as using a doctor Blade). Here, the electrode is prepared by drop casting the stock solution of transition metal phosphide onto a substrate which is then annealed at a suitable temperature. By using drop casting, which is a simple process, minimal wastage of material can be achieved.

The annealing step described above may be carried out at a temperature in the range of about 200° C. to about 350° C., about 200° C. to about 250° C., about 200° C. to about 300° C., about 250° C. to about 300° C., about 250° C. to about 350° C., about 300° C. to about 350° C. The annealing step may be conducted under constant flow of inert gas, for example, argon or helium. The annealing step may be conducted for about 1 to about 3 hours, about 1 hour, about 1.5 hours, about 2 hours, about 2.5 hours or about 3 hours.

The substrate may be any suitable substrate, for example fluorine doped tin oxide substrate (FTO).

After the transition metal phosphide-based electrode is formed, the electrocatalytic activity of the transition metal phosphide-based electrode may be evaluated. To evaluate the electrocatalytic activity, a suitable electrochemical method that may include voltametric method for example linear sweep voltammetry is conducted. The linear sweep voltammetry is conducted in a basic condition, preferably in a strong base solution such as sodium hydroxide or potassium hydroxide or other suitable strong base solution. A three-electrode configuration is used consisting of a working electrode, a counter electrode and a reference electrode. This three-electrode configuration allows a careful control of both potential and current in the system. In a conventional two-electrode system, as the voltage is increased progressively, the reference electrode will get polarized due to iR drop, hence, its potential will no longer be constant resulting in inaccurate potential reading. However, when the counter electrode (which is the third electrode) is added, the iR drop is minimized rendering a constant potential at the reference electrode side. In the example provided below, cobalt phosphide coated on FTO is used as the working electrode, platinum metal is used as the counter electrode and Ag/AgCl is used as the reference electrode. The cobalt phosphide in the thin film exhibited a sharp increase of current densities after the potential is increased to about 1.3 Volts (vs. RHE). The highest current density of 10 mA cm$^{-2}$ was generated at the voltage of about 1.59 Volts. When the blank FTO is used as the working electrode, negligible current density is observed indicating that the electrocatalytic activities are originated solely from the cobalt phosphide as described herein.

Exemplary, non-limiting embodiments of a method for producing hydrogen will now be disclosed. The method may comprise the step of electrolyzing water in the presence of a cobalt phosphide-based electrode prepared as defined herein.

Electrolytic splitting or electrolyzing of water is the decomposition of water into hydrogen and oxygen. In an electrolytic cell, an electrical power source is connected to two electrodes which are immersed in water or an aqueous solution containing ion-releasing substance. At the negatively charged cathode, a reduction takes place according to half-equation (ii) or (iv) (mentioned in the Background section) depending on the pH. At the positively charged anode, an oxidation reaction takes place according to the half-equation (i) or (iii) (mentioned in the Background section). Accordingly, the cathode is referred to as hydrogen evolution reaction (HER)-electrode and the anode is referred to as oxygen evolution reaction (OER)-electrode.

Here, at least one of the electrodes, either HER- or OER-electrode may be constructed from transition metal phosphide materials. Alternatively, the combination of a suitable HER-electrode made from non-transition metal phosphide materials in conjunction with transition metal phosphide-based OER-electrode may also be used. When cobalt phosphide material is used as the electrode, dicobalt phosphide synthesized in this disclosure may be used and hence such electrode is termed as a cobalt phosphide-based electrode. The dicobalt phosphide used is preferably at the nanosize range. Suitable HER-electrode may include but not limited to platinum electrode, Fe—Ni—O electrode, Ni phosphide-based electrode, cobalt oxide electrode, gallium arsenide electrode.

The electrical power source connected to the electrolytic cell generates the excess energy in the form of overpotential to overcome the energy or potential barriers. Such electrical power source may be any source of stored or generated electrical current or potential, which can be an alternating current (AC) or direct current (DC), including batteries, electrical generators, an electrical rectifier, an electrical inverter, an electrical transformer, or renewable energy source for example solar cell. In the present disclosure, a conventional silicon solar cell is used to generate the electricity from sunlight. It can be appreciated that other forms of renewable energy source may also be used in this application.

The electrolytic process for splitting of water may be carried out at about room temperature and around atmospheric pressure. Hence, this method can potentially be scaled up easily. In the electrolytic process described here, a large amount of gases evolved is observed on the surface of the electrodes (oxygen on the anode and hydrogen on the cathode). The gaseous products generated can be then analysed using a suitable method for example gas chromatography. Without the interference of other possible reactions, the water splitting process described herein may generate hydrogen and oxygen at a stoichiometric ratio of about 2 to about 1.

As water is a weak electrolyte, a trace amount of ion releasing substance may need to be added. Non-limiting examples of such substance are strong acids for example hydrochloric acid, hydroiodic acid and hydrobromic acid or strong bases for example sodium hydroxide and potassium hydroxide or salts for example sodium chloride, potassium chloride, sodium sulphate or sodium nitrate. It is noteworthy that the ion releasing substrate should not undergo redox reaction within the range of operating potential of the electrochemical cell, otherwise by-products may be formed thereby lowering the overall efficiency of the process.

The transition metal phosphide-based electrode described herein may be reused for another cycle of electrolysis with the same activity and versatility as the first use. It can be then concluded that the transition metal phosphide-based electrode prepared in this disclosure is durable and can be reused without noticeable decrease in electrocatalytic activity. In the example provided, the electrochemical cell used is attached to a high vacuum line and in-line mass spectrometer coupled with a thermal conductivity detector for direct gas analyses. For a period of about 5 hours, the amount of hydrogen evolved was 772 µmol and 764 µmol for the first and repeated cycle, respectively.

BRIEF DESCRIPTION OF THE DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic diagram showing the unit cell and atom sites of dicobalt phosphide (ICSD 43685).

FIG. 2 (A) is a schematic diagram illustrating the synthesis of phase-pure dicobalt phosphide nanostructures prepared according to Example 1. (B) is a graph showing the X-ray diffraction (XRD) pattern of cobalt phosphide A synthesized according to Example 1; (C) is a picture of transmission electron microscopy (TEM) image (at a scale of 100 nm) of the dicobalt phosphide produced according to Example 1; and (D and E) are pictures of High-Resolution transmission electron microscopy (HRTEM) images (at a scale of 5 nm for each HRTEM image) of dicobalt phosphide nanowires prepared according to Example 1.

FIG. 3 (A) is a schematic diagram illustrating the synthesis of a phase-pure dicobalt phosphide nanostructures prepared according to Example 2; (B) is a graph showing the XRD pattern of cobalt phosphide B synthesized according to Example 2; (C) is a picture of the TEM image of cobalt phosphide B in the form of nanorods prepared according to Example 2; (D) is a schematic diagram illustrating the synthesis of a phase-pure dicobalt phosphide nanostructures prepared according to Example 4; (E) is a graph showing the XRD pattern of cobalt phosphide D synthesized according to Example 4; (F) is a picture of the TEM image of cobalt phosphide D in the form of nanorods prepared according to Example 4; (G) is a schematic diagram illustrating the synthesis of a phase-pure dicobalt phosphide nanostructures prepared according to Example 3; (H) is a graph showing the XRD pattern of cobalt phosphide C synthesized according to Example 3; (I) is a picture of the TEM image of cobalt phosphide C in the form of nanorods prepared according to Example 3. All TEM images here are at a scale of 100 nm.

FIGS. 4 (A and B) are a scanning electron microscopy (SEM) image (at a scale of 10 microns) and corresponding energy dispersive spectra of cobalt phosphide synthesized according to Example 4. (C and D) are a SEM image (at a scale of 9 microns) and corresponding energy dispersive spectra of cobalt phosphide prepared according to Example 3. The purified cobalt phosphides were thermally treated at 400° C. for 120 minutes to remove the capping ligands. The energy dispersive spectra are collected from as-prepared nanostructures in selected areas as marked by the red rectangles in (A and C). The Au signals are from the Au sputtering before the SEM characterization.

FIG. 5 (A) is a picture illustrating a FTO substrate coated with cobalt phosphide solution using drop casting method; (B) is a picture showing cobalt phosphide-based electrode in electrolysis.

FIG. 6 (A) is a graph showing the electrochemical properties of cobalt phosphide thin films prepared according to Example 6 that is treated at 250° C. under argon. Linear sweep voltammetry experiments were recorded in 1 M of NaOH solution (pH 14) at a scan rate of 0.05 Volts per second. (B) is a graph showing the hydrogen evolution of phase-pure cobalt phosphide thin films treated at 250° C. under argon. Two cycles of 5-hours experiments were conducted in 1 M of sodium hydroxide solution (pH 14) which was driven by solar cell under simulated AM 1.5 G 100 mW cm-2 illumination.

FIG. 7 is a graph showing chromatogram from a gas chromatography (GC) experiment from Example 7 in which H2 and O2 generated on the dicobalt phosphide-based electrodes were treated at 250° C. under argon. The experiment was conducted in an airtight electrochemical cell with a two-electrode configuration in 1 M of sodium hydroxide solution (pH 14). The solar cell was under AM 1.5 G 100 mW cm-2 illumination.

EXAMPLES

Non-limiting examples of the invention and a comparative example will be further described in greater detail by reference to specific Examples, which should not be construed as in any way limiting the scope of the invention.

Example 1: Synthesis of Cobalt Phosphide A

Cobalt phosphide A was prepared by first dissolving 1.5 mmol of cobalt (II) carbonate (CoCO3, 99%, obtained from Sigma-Aldrich of Missouri of the United States of America) in 4.5 mmol of oleic acid (OA, CH3(CH2)7CH=CH(CH2) 7COOH, cis 70%, obtained from Sigma-Aldrich of Missouri of the United States of America) and 5 ml of TOP ([CH3 (CH2)7]3P, 90%, obtained from Sigma-Aldrich of Missouri of the United States of America) forming a mixture. The temperature of the mixture was then adjusted to 110° C. with vigorous magnetic stirring followed by degassing in vacuum for 15 minutes. At this temperature, cobalt (II) carbonate dissolved in TOP and blended with oleic acid to form cobalt oleate and by-product CO2. The degassing procedure is crucial to prevent oxygen to enter into the reaction chamber thereby inhibiting the reaction. The post-degassing mixture exhibited a homogeneous translucent violet color, indicating a complete dissolution of Co2+ and the formation of the cobalt oleate. The mixture was then further heated up under inert (argon gas). At about 260° C., the thermal decomposition of cobalt oleate took place in TOP, where TOP serves as both a solvent and the phosphorous precursor. The color of the solution gradually changed from violet to dark blue and eventually turned to black. The reaction temperature was further increased to a predetermined value of 320° C. and maintained at this temperature for 120 minutes. The resulting mixture was then allowed to cool down to room temperature. An excess amount of hexane (analytical grade, obtained from Riverbank Chemicals of Singapore) and ethanol (analytical grade, obtained from Riverbank Chemicals of Singapore) was added to precipitate off the cobalt phosphide A. The solid products obtained were purified by centrifugation and collected in the powder form. Solid cobalt phosphide A may be dispersed in the typical organic solvents, but not limited to hexane, toluene and chloroform. Analysis of the cobalt phosphide A obtained revealed that nanowires are formed with the diameter of about 6.5 nm and the length of about 280 nm (FIG. 2(C)).

XRD analysis was performed to investigate the crystal structure of the synthesized cobalt phosphide A. With reference to FIG. 2(B), the XRD pattern using 6.9303 keV photons (Co Kα1 equivalent) from synchrotron light source showed the formation of orthorhombic dicobalt phosphide with high phase purity (JCPDS No.: 29-0497). Further, the high-resolution of TEM (denoted as HRTEM) images of the nanowires as shown in FIGS. 2(D) and 2(E), describe the single crystalline nature of the synthesized cobalt phosphide A. With reference to FIG. 2(D), the cobalt phosphide A grows parallel to the (211) facet as shown by the regular lattice spacing of 2.09 Angstrom run along the longitudinal axis of nanowires. The curvilinear surface was covered with uniform lattice spacing of 2.21 Angstrom from (121) facet as can be seen in FIG. 2(E) and both (211) and (121) facets gain significant reflections in XRD pattern shown in FIG. 2(B).

Example 2: Synthesis of Cobalt Phosphide B

To investigate the influence of temperature and different reagents on the chemical phase and the shape or size of the synthesized cobalt phosphide, cobalt phosphide B was prepared using the same method as described in Example 1 but with final temperature set to 290° C. instead of 320° C. and with adding 3 mmol of oleylamine (denoted as OAM thereafter, CH3(CH2)7CH=CH(CH2)7CH2NH2, cis 70%, obtained from Sigma-Aldrich of Missouri of the United States of America) to the reaction mixture (see FIG. 3(A)).

TEM and XRD studies were carried out to investigate the properties of the nanostructures obtained. As revealed in FIGS. 3(B) and 3(C), the XRD pattern of the nanostructures synthesized using cobalt (II) carbonate in 4.5 mmol of oleic acid, 5 ml of TOP with the addition of 3 mmol of oleylamine features dicobalt phosphide phase. It is surprisingly found that the crystallinity of nanostructures was reduced when the temperature is decreased to 290° C. It is noteworthy that the addition of oleylamine changed the shape of the synthesized nanostructures into short nanorods.

Example 3: Synthesis of Cobalt Phosphide C

Here, cobalt phosphide C was synthesized using the method as described in Example 1. Cobalt (II) acetylacetate (Co(AcAc)2, 99%, obtained from Sigma-Aldrich of Missouri of the United States of America) was used as the cobalt (II) salt instead of cobalt (II) carbonate (see FIG. 3(G)). The final temperature of the reaction mixture was set to 290° C. XRD analysis depicted in FIG. 3(H) shows an amorphous pattern with no recognizable peaks. Further, inspection of SEM energy-dispersive X-ray spectroscopy (EDX) analysis depicted in FIG. 4(C) and FIG. 4(D) confirms that the chemical composition of cobalt phosphide C had the atomic ratio of cobalt to phosphorous about 2 to 1. This example demonstrates the synthesis of amorphous dicobalt phosphide nanostructures. The morphology of cobalt phosphide C was nanowire (FIG. 3(I)).

Example 4: Synthesis of Cobalt Phosphide D

Cobalt phosphide D was prepared following the synthesis steps described in Example 1 but with the final temperature set to 290° C. and addition of 3.0 mmol of OAM to the initial reaction mixture (see FIG. 3(D)). FIG. 3(E) reveals that the collected cobalt phosphide D gave two majors peaks from dicobalt phosphide phase. Further, inspection of SEM energy-dispersive X-ray spectroscopy (EDX) analysis shown in FIG. 4 (A to B) confirmed that the chemical composition of cobalt phosphide C has the atomic ratio of cobalt to phosphorous about 2 to 1. In addition, the cobalt phosphide produced in this example showed some degree of mixing of crystalline and amorphous structures (see FIG. 3(F)). As observed in Example 2, the shape of cobalt phosphide C was nanorod.

Example 5: Preparation of Cobalt Phosphide Thin Films

FTO-coated glass slides of dimension 2.5 cm×1.5 cm (of 0.22 cm in thickness with resistance of about 20Ω, obtained from Latech of Singapore) were cleaned by ultrasonification in acetone and water for 10 minutes each and dried in nitrogen stream. A thin film of cobalt phosphide obtained in the previous examples was prepared by drop casting toluene solution of the cobalt phosphide nanostructures (prepared in Examples 1 to 4) onto FTO substrate. The resulting homogeneous cobalt phosphide nanostructures thin film on FTO substrate (FIG. 5(A)) was used for electrochemical characterization on 1 cm×1 cm silicon substrate for XRD measurement. The resulting cobalt phosphide thin film on FTO substrate was annealed at 250° C. for 2 hours in argon.

Example 6: Electrocatalytic Activity

The electrocatalytic activities of the cobalt phosphides A, B, C and D were investigated using voltammetric technique. Linear sweep voltammetry was conducted in 1 M of NaOH electrolyte using three-electrode configuration (cobalt phosphide/FTO as the working electrode, Pt as the counter electrode (Metrohm of Herisau of Switzerland) and Ag/AgCl as the reference electrode (Metrohm of Herisau of Switzerland)). With reference to FIG. 6(A), cobalt phosphide C in thin film displayed a sharp increase of current densities after the potential was increased higher than about 1.3 Volts (vs. RHE). Generally, all of the cobalt phosphides prepared according to Examples 1 to 4 exhibited high electrocatalytic activities at low overpotential. The highest current density of 10 mA cm-2 at 1.59 Volts (vs. RHE) was generated from cobalt phosphide D. As a negative control, the same experiment was conducted using the blank FTO. The results show that the blank FTO exhibited negligible current density upon increasing the voltage linearly from 1.0 Volts to 2.0 Volts. This confirms that the electrocatalytic activities originated exclusively from cobalt phosphides prepared in the Examples 1 to 4.

Example 7: Process for Electrocatalytic Splitting of Water Using Cobalt Phosphide D-Based Electrode To produce the hydrogen from a renewable energy source, the external bias was connected to a conventional silicon solar cell to generate electricity from sunlight. Cobalt phosphide D was selected for hydrogen generation in electrolytic water splitting in a two-electrode configuration (with Pt electrode used as the HER electrode). Under AM 1.5 G illumination on the solar cell, a large amount of bubbles were observed on the surface of the working electrode (where O2 is produced) and counter electrode (where H2 is produced) immersed in the solution containing 1 M of NaOH. These gaseous products were identified using an airtight electrochemical cell attached to a high-vacuum line and in-line mass spectrometer coupled with a thermal conductivity detector. For a period of 5 hours, the amount of hydrogen evolved was determined to be 772 and 764 □mol for the first and repeated cycle, respectively (refer to FIG. 6(B)). This indicated that the cobalt phosphide D based-electrocatalyst remained highly stable and may be reused for another cycle of electrolysis. The mass spectrum of gas samples confirmed the solar-driven electrocatalytic splitting of water to hydrogen and oxygen at a ratio of about 2 to 1 as indicated in FIG. 7. The volume of hydrogen and oxygen gases evolved were confirmed using a Shimadzu GC-2014 AT gas chromatography equipped with a 5 Å molecular sieve column (4 m×⅛" OD) and a thermal conductivity detector with argon gas as the carrier gas.

Thus, it can be seen that a method of preparing the cobalt phosphide as described herein allows the production of cobalt phosphide with controlled shape, size and phase. In addition, the present disclosure provides a method for preparing phase-pure cobalt phosphide-based electrodes that can be used for the splitting of water. The electrolysis process using such electrodes can be carried out at room temperature and atmospheric pressure, which can be easily scaled-up.

INDUSTRIAL APPLICABILITY

In the present disclosure, the process for electrocatalytic splitting of water using transition metal phosphide-based electrode may be used in conjunction with a solar cell or other suitable renewable energy source to achieve high efficiency water splitting for hydrogen production. The process may be incorporated in the manufacturing plant of ammonia via Haber process and in a plant for producing methanol. In addition, the hydrogen produced from the process described herein may be used in the hydrogenation process of fats and oils widely used in the food industry. As the process can be scaled up easily, the process may be used to generate hydrogen that can be further utilized in the hydrogen fuel cell or combustion in internal engines to power vehicle and electric devices. In addition, it can also be used in the propulsion of spacecraft and might potentially be produced in large scale for passenger vehicles and aircraft.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A method of preparing a transition metal phosphide comprising:
heating a solution of a transition metal precursor and a phosphorous precursor at a temperature in the range of 90° C. to 130° C.; and
mixing said solution to form said transition metal phosphide.

2. The method of claim 1, wherein the transition metal precursor contains transition metal that is cobalt (Co), iron (Fe), nickel (Ni), manganese (Mn), or combinations thereof.

3. The method of claim 1, further comprising the operation of adding an additive to said solution mixture to promote ionization and solubilization of said transition metal precursor.

4. The method of claim 3, wherein said additive is oleylamine (OAM).

5. The method claim 1, further comprising the operation of degassing the mixture.

6. The method of claim 5, wherein said degassing of the mixture is undertaken in a vacuum and in an inert gas atmosphere.

7. The method of claim 5, wherein said degassing operation is undertaken for a period of time in the range of 10 minutes to 30 minutes.

8. The method of claim 1, further comprising the operation of heating the mixture at a predetermined temperature.

9. The method of claim 8, wherein said predetermined temperature is in the range of 270 to 350° C.

10. The method of claim 8, wherein the solution mixture is kept at said predetermined temperature for 90 minutes to 150 minutes.

11. The method of claim 1, wherein said transition metal precursor is selected from the group consisting of transition metal acetylacetonate, transition metal carbonate, transition metal benzoylacetonate, transition metal bromide, transition metal chloride, transition metal fluoride, transition metal iodide, transition metal nitrate, transition metal oxalate, transition metal phosphate, transition metal sulphate, transition metal acetate, transition metal thiocyanate and mixtures thereof.

12. The method of claim 1, wherein said phosphorous precursor is selected from the group consisting of trioctyl phosphine (TOP), tributyl phosphine, trinonyl phosphine oxide, trioctyl phosphine oxide (TOPO), trihexyl phosphine oxide, butyl diphenyl oxide and tert-butyl diphenyl oxide.

13. A transition metal phosphide particle made according to a method of preparing transition metal phosphide comprising heating a solution of a transition metal precursor and a phosphorous precursor at a temperature in the range of 90° C. to 130° C. and mixing said solution to form said transition metal phosphide.

14. The transition metal phosphide particle of claim 13, wherein said transition metal phosphide particle is in the form of a wire, a rod, a sphere or a sheet.

15. The transition metal phosphide particle of claim 13, wherein said transition metal phosphide is amorphous or semi-crystalline.

16. A method of preparing a transition metal phosphide-based electrode used for producing hydrogen in the electrolysis of water, comprising:
   a. mixing a solution of a transition metal precursor and a phosphorous precursor under conditions to form a transition metal phosphide solution;
   b. casting said transition metal phosphide solution onto a substrate; and
   c. annealing of the substrate coated with the transition metal phosphide solution.

17. The method of claim 16, wherein said transition metal phosphide is dicobalt phosphide.

18. The method of claim 16, wherein said annealing operation is undertaken at a temperature in the range of 200° C. to 350° C.

* * * * *